Patented July 2, 1929.

1,719,792

UNITED STATES PATENT OFFICE.

FRANZ ACKERMANN, OF BINNINGEN, NEAR BASEL, AND PAUL SCHETELIG, OF BASEL, SWITZERLAND, ASSIGNORS TO SOCIETY OF CHEMICAL INDUSTRY IN BASLE, OF BASEL, SWITZERLAND.

CONDENSATION PRODUCT OF THE ANTHRAQUINONE SERIES AND PROCESS OF MAKING SAME.

No Drawing. Application filed May 18, 1925, Serial No. 31,202, and in Switzerland August 2, 1924.

The present invention relates to new dyestuffs valuable for the production of fast tints on the fibre. It comprises the new products, the process of making same, and the material dyed with the new dyestuffs.

In U. S. Patent 1,437,783 there is described a process consisting in treating amino-compounds of the anthraquinone series, the amino group of which may also be mono-substituted, with derivatives of 1.3-5-triazine halogenated in the nucleus, as for instance cyanuric chloride. There are thus obtained valuable condensation products containing 1.3.5-triazine nuclei which may be used partly as coloring matters, partly as starting materials for the production of dyestuffs.

As a result of further study and experiment on the lines of the above cited fundamental process we have found that valuable new products are obtained by causing nucleal halogen derivatives of the 1.3.5-triazine to react on compounds of the general formula:

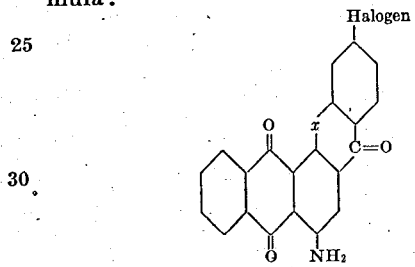

wherein the letter $x$ stands for a NH group or a sulfur atom, and, in some cases, condensing the resulting condensation products simultaneously or subsequently with suitable compounds such for instance as are disclosed in U. S. Patent No. 1,437,783 above mentioned: specifically aniline, sodium ethylate, thionaphthol, aminoanthraquinones.

There are thus obtained dyestuffs of the general formula:

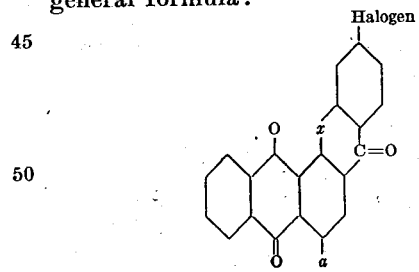

wherein the letter $x$ stands for a NH group or a sulfur atom and $a$ for the radical

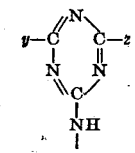

$y$ and $z$ being substituents of which one at least is an amino radical which may be further substituted. They form brown to violet and blue powders which dissolve in concentrated sulfuric acid to red and orange-red to brown solutions, yielding with hydrosulfite and caustic soda solution violet to brown vats, which dye cotton very fast red-violet to brown, grey, blue and green tints.

The anthraquinone-4-amino-4'-halogen-2:1-thioxanthones or -acridones which serve as intermediate products in the manufacture are bluish powders soluble in sulfuric acid to yellow to red-orange solution and yielding with hydrosulfite and caustic soda solution violet vats. They are obtained by condensing one molecular proportion of a 1-halogen-4-amino-or 1-halogen-4-acidylaminoanthraquinone with one molecular proportion of a compound of the general formula

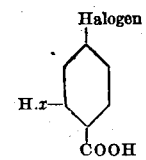

in which $x$ represents NH or S, to a product which may be regarded as having the formula

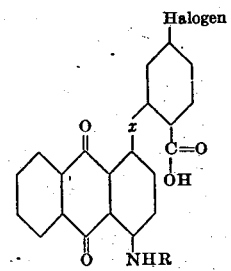

in which R is hydrogen or an acidyl group, and then producing ring closure in this compound by treatment with a condensing agent, if necessary after saponification of the acidyl group.

The following examples illustrate the invention, the parts being by weight:—

Example 1.

39 parts of anthraquinone-4-amino-4'-chloro-2:1-thioxanthone are introduced into 500 parts of nitrobenzene and 9.3 parts of cyanuric chloride are added. The mixture is heated gradually, while stirring, to the boiling point of nitrobenzene and stirring is continued for some hours at this temperature. The cooled liquid is filtered and the solid matter washed with nitrobenzene and alcohol and then dried. This new condensation product is a brown violet powder which dissolves in concentrated sulfuric acid to a red solution and yields a violet vat with hydrosulfite and caustic soda solution which dyes cotton red-violet, very fast to light, washing, potting and chlorine.

The formula of the new dyestuff is most probably:

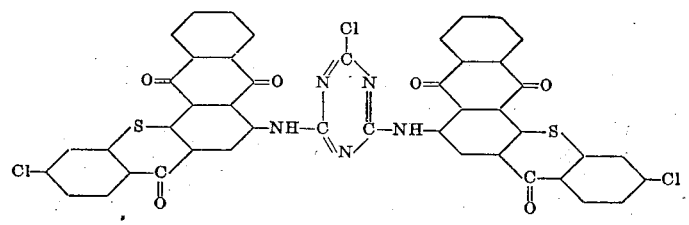

If the condensation is conducted at a somewhat lower temperature in presence of diethylaniline an essentially more blue dyestuff is obtained.

Example 2.

80 parts of the dyestuff made as described in Example 1 are stirred for a long time with about 1600 parts of aniline at 150–160° C. After cooling, the mixture is filtered and the solid matter washed with aniline and alcohol and then dried. The new dyestuff is a violet powder which dissolves in concentrated sulfuric acid to a red solution and yields with hydrosulfite and caustic soda solution a blue violet vat which dyes cotton violet tints of remarkable fastness to light, washing and chlorine.

The formula of the new dyestuff is most probably:

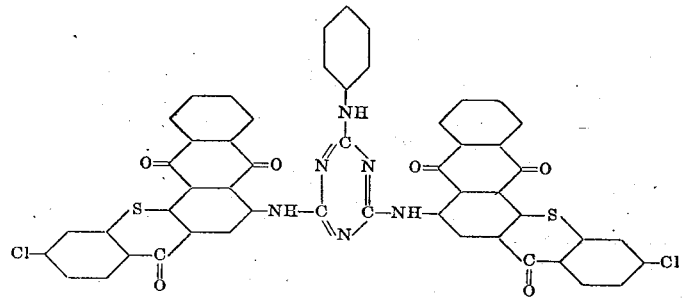

Example 3.

12 parts of 1:5-diaminoanthraquinone are introduced into about 600 parts of nitrobenzene and 18.6 parts of cyanuric chloride are added. The mixture is then heated gradually, while stirring, to 140–145° C., kept at this temperature for some time and then there are added 19 parts of anthraquinone-4-amino-4'-chloro-2:1-thioxanthrone and the mixture is kept for some time at this temperature with constant stirring, whereupon 12 parts of α-aminoanthraquinone are added and the whole is heated to the boiling point of nitrobenzene until the reaction is complete. After cooling, the mixture is filtered and the solid matter washed with nitrobenzene and alcohol. The new dyestuff is a brown powder soluble in concentrated sulfuric acid to a brown solution and yielding with hydrosulfite and caustic soda solution a brown vat which dyes cotton very fast brown tints.

The formula of the new dyestuff is most probably:

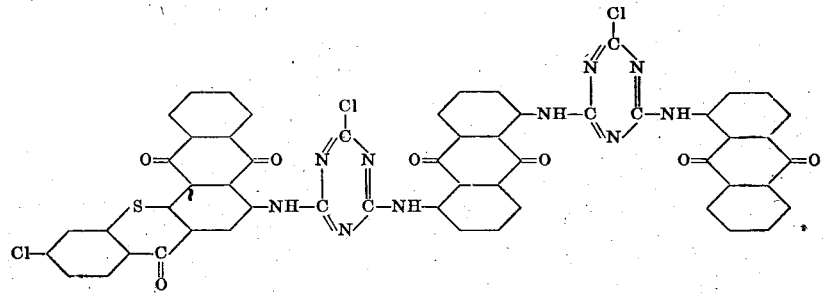

Example 4.

9.3 parts of cyanuric chloride, 38 parts of anthraquinone - 4 - amino-4'-chloro-2:1-acridone and 750 parts of nitrobenzene are heated together, while stirring, first gradually to 140-150° C. and then to 190-200° C. at which latter temperature the mixture is kept for some time. After cooling and filtering the solid matter is washed with warm nitrobenzene and with alcohol and dried. The new condensation product is a blue powder soluble in concentrated sulfuric acid to an orange red solution and yielding with hydrosulfite and caustic soda solution a red violet vat which dyes cotton a blue fast to light, chlorine, potting and washing.

The formula of the new dyestuff is most probably:

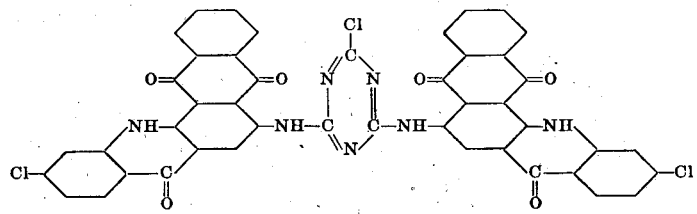

If the condensation is conducted at a somewhat lower temperature in the presence of diethylaniline an essentially greener dyestuff is obtained.

In like manner there is obtained from one molecular proportion of cyanuric chloride, one molecular proportion of anthraquinone-4-amino-4'-chloro-2:1-thioxanthone and one molecular proportion of α-aminoanthraquinone a red brown dyestuff; from one molecular proportion of cyanuric chloride, one molecular proportion of anthraquinone-4-amino-4'-chloro-2:1-thioxanthone and one molecular proportion of anthraquinone-4-amino-2:1-acridone a red brown dyestuff; from two molecular proportions of cyanuric chloride, one molecular proportion of the technical mixture of 1:5- and 1:8-diaminoanthraquinone, one molecular proportion of anthraquinone-4-amino-4'-chloro-2:1-thioxanthone and one molecular proportion of anthraquinone-4-amino-2:1-acridone a neutral grey dyestuff; from one molecular proportion of cyanuric chloride, one molecular proportion of anthraquinone-4-amino-4'-chloro-2:1-acridone and one molecular proportion of aminoanthraquinone a green dyestuff.

What we claim is:

1. The herein described process for the manufacture of condensation products of the anthraquinone series by causing nucleal halogen derivatives of the 1:3:5-triazine to react on compounds of the general formula

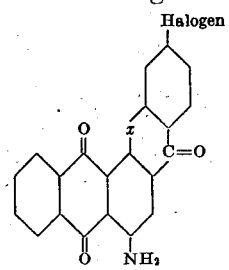

wherein the letter $x$ stands for a NH-group or a sulfur atom.

2. The herein described process for the manufacture of condensation products of the anthraquinone series by causing nucleal halogen derivatives of the 1:3:5-triazine to react on compounds of the general formula

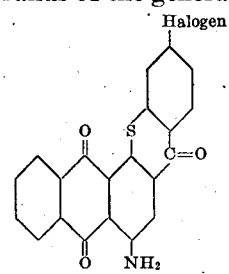

3. The herein described process for the manufacture of condensation products of the anthraquinone series by causing nucleal halogen derivatives of the 1:3:5-triazine to react on compounds of the general formula

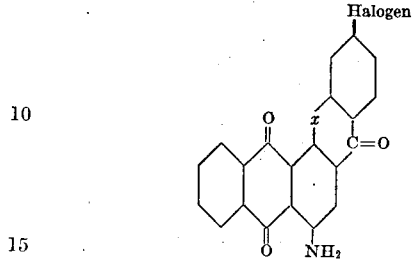

wherein the letter $x$ stands for a NH-group or a sulfur atom, and condensing the resulting reaction products with further compounds having $NH_2$ groups.

4. The herein described process for the manufacture of condensation products of the anthraquinone series by causing nucleal halogen derivatives of the 1:3:5-triazine to react on compounds of the formula

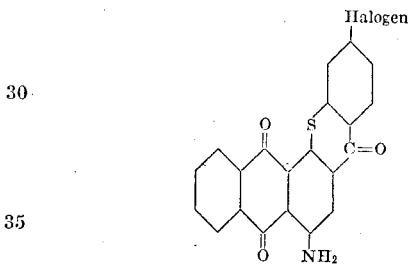

and condensing the resulting reaction products with further compounds having $NH_2$ groups.

5. The herein described process for the manufacture of condensation products of the anthraquinone series by causing one molecule of cyanuric chloride to react on one molecule of a compound of the general formula

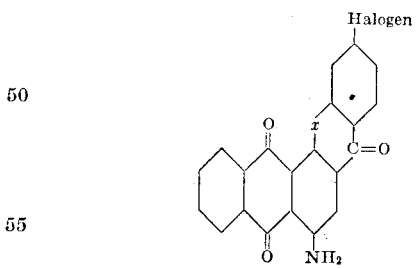

wherein the letter $x$ stands for a NH-group or a sulfur atom, and condensing the resulting condensation product with one molecule of the same compound of the above specified general formula.

6. The herein described process for the manufacture of condensation products of the anthraquinone series by causing one molecule of cyanuric chloride to react on one molecule of a compound of the general formula

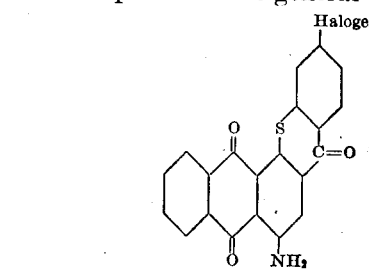

and condensing the resulting condensation product with one molecule of the same compound of the above specified general formula.

7. As new products the herein described condensation products of the general formula

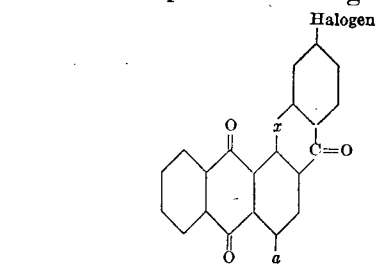

wherein the letter $x$ stands for a NH-group or a sulfur atom and wherein $a$ is a radical

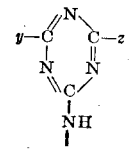

$y$ and $z$ being substituents of which one at least is an amino radical which may be further substituted, which products form brown to violet and blue powders which dissolve in concentrated sulfuric acid to red and orange-red to brown solutions, yielding with hydrosulfite and caustic-soda solution violet to brown vats, which dye cotton very fast red-violet to brown, grey, blue and green tints.

8. As new products the herein described condensation products of the general formula

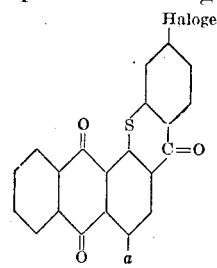

wherein $a$ is a radical

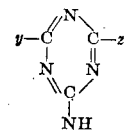

$y$ and $z$ being substituents of which one at least is an amino radical which may be further substituted, which products form brown to violet and blue powders which dissolve in concentrated sulfuric acid to red and orange-red to brown solutions, yielding with hydrosulfite and caustic soda solution violet to brown vats, which dye cotton very fast red-violet to brown, grey, blue and green tints.

9. As new products the herein described condensation products of the general formula

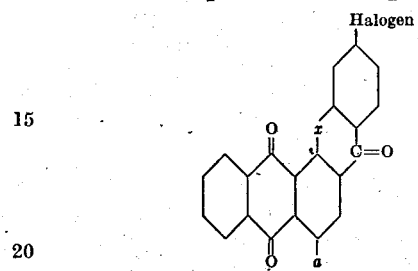

wherein the letter $x$ stands for a NH-group or a sulfur atom and wherein $a$ is a radical

$y$ and $z$ being substituents of which one at least is an aryl-aminoradical which contains an anthraquinone nucleus, which products form brown to violet and blue powders which dissolve in concentrated sulfuric acid to red and orange-red to brown solutions, yielding with hydrosulfite and caustic soda solution violet to brown vats, which dye cottom very fast red-violet to brown, grey, blue and green tints.

10. As new products the herein described condensation products of the general formula

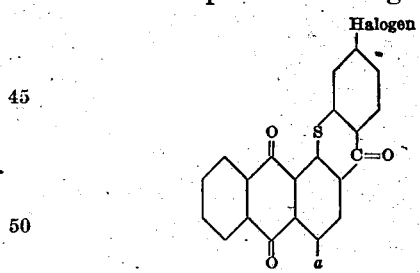

wherein $a$ is a radical

$y$ and $z$ being substituents of which one at least is an aryl-aminoradical which contains an anthracquinone nucleus, which products form brown to violet and blue powders which dissolve in concentrated sulfuric acid to red and orange-red to brown solutions, yielding with hydrosulfite and caustic soda solution violet to brown vats, which dye cotton very fast red-violet to brown, gray, blue and green tints.

11. As new products the herein described condensation products of the symmetrical formula

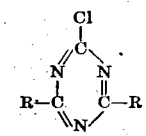

wherein the two R mean a compound of the general formula

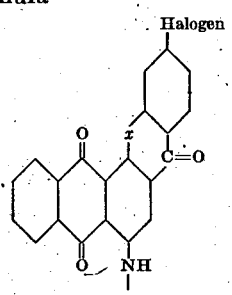

wherein the letter $x$ stands for a NH-group of a sulfur atom and in which the NH-group is linked to the cyanuric nucleus, which products form brown-violet to blue powders, which dissolve in concentrated sulfuric acid to a red to orange red solution, yielding with hydrosulfite and caustic soda solution violet to red-violet vats, which dye cotton red-violet to blue tints very fast to light, washing, potting and chlorine.

12. As new products the herein described condensation products of the symmetrical formula

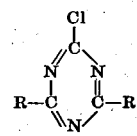

wherein the letter $x$ stands for a NH-group general formula

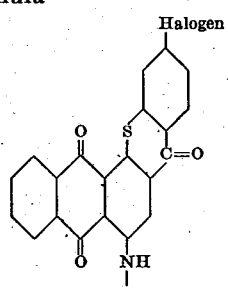

in which the NH-group is linked to the cyanuric nucleus, which products form brown-violet powders which dissolve in concentrated sulfuric acid to a red solution, yielding with hydrosulfite and caustic soda solution a violet vat which dyes cotton red-violet tints very fast to light, washing, potting and chlorine.

13. Material dyed with the dyestuffs of claim 7.
14. Material dyed with the dyestuffs of claim 8.
15. Material dyed with the dyestuffs of claim 9.
16. Material dyed with the dyestuffs of claim 10.
17. Material dyed with the dyestuffs of claim 11.
18. Material dyed with the dyestuffs of claim 12.

In witness whereof we have hereunto signed our names, this 5th day of May, 1925.

FRANZ ACKERMANN.
PAUL SCHETELIG.